Jan. 6, 1970     T. Z. HERR     3,488,074

DOOR OPERATING AND LOCKING MECHANISM

Original Filed Feb. 15, 1967     9 Sheets-Sheet 2

Inventor
Theodore Z. Herr
BY Andrus & Starke
Attorneys

Inventor
Theodore Z. Herr
BY
Andrus & Starke
Attorneys

United States Patent Office 3,488,074
Patented Jan. 6, 1970

3,488,074
DOOR OPERATING AND LOCKING MECHANISM
Theodore Z. Herr, 672 Hyacinth Place,
Highland Park, Ill. 60035
Original application Feb. 15, 1967, Ser. No. 616,221, now Patent No. 3,386,205, dated June 4, 1968. Divided and this application Mar. 29, 1968, Ser. No. 717,332
Int. Cl. E05c 5/00
U.S. Cl. 292—65   12 Claims

ABSTRACT OF THE DISCLOSURE

A locking mechanism for a sliding flush door for a railway car. The door is locked within the opening in the railway car by a series of slide bolt assemblies which are located along the edges of the door. Each slide bolt assembly includes a bolt which is slidably mounted in a housing and is engageable with a latch on the wall of the car adjacent the door. The bolt is provided with at least one camming element which is engageable with a cam surface on the housing so that as the bolt is moved toward the locking position, the outer end of the bolt will be cammed inwardly toward the door to engage the latch and gather the door within the opening.

---

This application is a division of application Ser. No. 616,221, filed Feb. 15, 1967, now Patent No. 3,386,205 and entitled A Door Operating and Locking Mechanism.

This invention relates to a door operating mechanism and more particularly to a structure for operating and locking a sliding flush door for use on a railway boxcar or refrigerator car.

Openings in the sides of a boxcar or refrigerator car are normally enclosed by sliding flush doors which slide in tracks mounted on the sides of the car above and below the door opening. After being moved to a position in alignment with the opening, the door is moved laterally into the opening so that the inner surface of the door is flush with the inner surface of the car. The door is then locked in this position. To provide both sliding and lateral movement for the door, the upper and lower ends of the door are pivotally connected to crank arms which carry rollers that ride in the tracks mounted on the car. The crank arms at the upper and lower edges of the door are usually mounted in vertical alignment and are connected to an operating mechanism located on the outside of the door.

In one common type of door operating unit, the crank arms themselves serve not only to move the door laterally into the opening in the car but also function to lock the door within the opening so that no auxiliary locking unit is employed. As the crank arms are connected to the manual operating mechanism through long rods, there is considerable torque on the rods so that an effective lock is not always accomplished.

In another common form of door construction, the operating mechanism on the outside of the door does not pivot the crank arms, but only operates the locking bolts. In a door of this kind, the door must be pushed manually inward into the opening in the car and then the operating mechanism is operated to lock the door in position. As the doors have considerable weight, it requires a considerable manual force to push the doors laterally in and out of the opening. Moreover, as the crank arms are freely pivotable, the door may tend to ride against the side wall of the car when the door is moved longitudinally along the side wall to expose the opening in the car. Thus, it is usually necessary to employ auxilliary rollers on the side wall of the car to facilitate sliding movement of the door.

The present invention is directed to an improved sliding flush door construction for use on a railway car in which the crank arms and the locking mechanism for the door are both actuated by the single movement of the operating mechanism. More specifically, the door is mounted for sliding movement on the tracks disposed on the side of the car above and below the door opening. A pair of crank arms are pivotally connected to the upper and lower edges of the door and each crank arm carriers a roller assembly which rides on the corresponding track to permit the door to be moved longitudinally along the side wall of the car. The vertically aligned crank arms at the top and bottom of the door are connected to vertical drive rods and the rods are rotated to pivot the crank arms by a bell crank mechanism actuated manually by a handle operating through a spiral cam arrangement. Manual rotation of the handle serves to rotate a cam plate having a spiral groove, and a cam follower riding in the spiral groove is attached to a slide plate so that rotation of the handle results in linear movement of the slide plate. Linear motion of the slide plate operates through the bell crank mechanism to rotate the drive rods and thereby pivot the crank arms to move the door laterally in and out of the opening in the railway car. In addition, a second bell crank mechanism is associated with the slide plate and is connected to locking bolts at the top and bottom of the door so that movement of the slide in one direction will move the locking bolts into locking engagement, while movement of the slide plate in the opposite direction will move the bolts to the unlocked position.

The operation of both bell crank mechanisms are programmed so that on opening of the door the initial movement of the slide plate will actuate the second bell crank mechanism to unlock the slide bolts. Unlocking of the slide bolts will release the compression of the door gasket and subsequent movement of the slide plate will then pivot the crank arms to move the door laterally outward of the opening in the side of the car. In closing and locking the door the action is reversed, with initial movement of the slide plate causing the crank arms to pivot to move the door laterally into the opening and subsequent movement of the slide plate operating the locking bolts to lock the door in place and compressing the door gasket.

In a modified form of the invention a toggle mechanism is substituted for the bell crank mechanism and linear movement of the slide plate is transmitted through the toggle mechanism to pivot the crank arms and move the door laterally into and out of the opening in the car side and to sequentially operate the locking bolts.

A provision is made in the construction of the invention to prevent overloading of the crank arms which carry the door. The drive rods which connect the bell crank mechanism with the door supporting crank arms are provided with a spring biased, overload unit. When the crank arms are pivoted to move the door into the opening in the car, the door gasket will engage the door frame and the force required to compress the gasket is designed to be greater than the force required to disengage the overload unit, so that continued rotation of the drive rods by the bell crank mechanism will disengage the overload unit to thereby prevent further torque being applied to the crank arms. Subsequent actuation of the locking bolts serves to gather the door into the opening and compress the gasket.

The door operating construction of the invention serves to move the door laterally into the opening in the railway car, as well as lock the door in position with a single movement of the operating mechanism. The spiral cam drive mechanism which transposes rotary motion of the handle to linear motion for the slide plate is a substantial improvement over prior art drive mechanisms. The spiral cam occupies a small space for the mechanical advantage that it offers and has the additional advantage of not being subjected to spring-back or backlash. Thus a force applied to the crank arms or door will not rotate or whip the handle back in the opposite direction.

The invention also includes an overload protection unit which prevents the operating mechanism from overloading the crank arms when the door is in the completely closed position.

The door operating unit of the invention is compact and projects outwardly only a few inches beyond the outer surface of the door, well within the maximum width requirements for railway cars.

Other objects and advantages will appear in the course of the following description.

The drawings illustrate the best mode presently contemplated of carrying out the invention.

In the drawings:

FIG. 7 is a section taken along lines 7—7 of FIG. 6;

Figure 2:
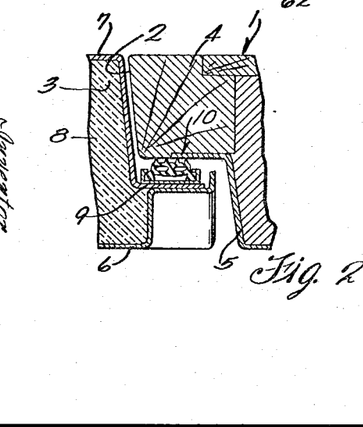
FIG. 2 is a horizontal section taken along line 2—2 of FIG. 1.

The drawings illustrate a railway car 1 such as a boxcar, refrigerator car or grain car, having an opening 2 in the side wall which is adapted to be enclosed by a sliding flush door 3. As best shown in FIG. 2, the side wall of the car 1 is of conventional construction and includes a side post 4 that extends vertically along the opening 2 and a reinforcing member 5 is connected to the side post and extends to the outer surface of the car.

The door 3 includes an outer face 6 and an inner face 7 which are separated by a lightweight insulating core 8. The inner face 7 is provided with an outwardly extending flange 9 and a seal assembly or gasket 10 is mounted on the flange 9 and is in compressed, tight sealing engagement with the flange of member 5 when the door 3 is in the closed and locked position.

The door and door frame construction shown in the drawings is merely illustrative of that commonly employed in railway cars, and it is contemplated that the door operating and locking mechanism of the invention can be utilized with various other types of door and door frame constructions.

Figure 1:
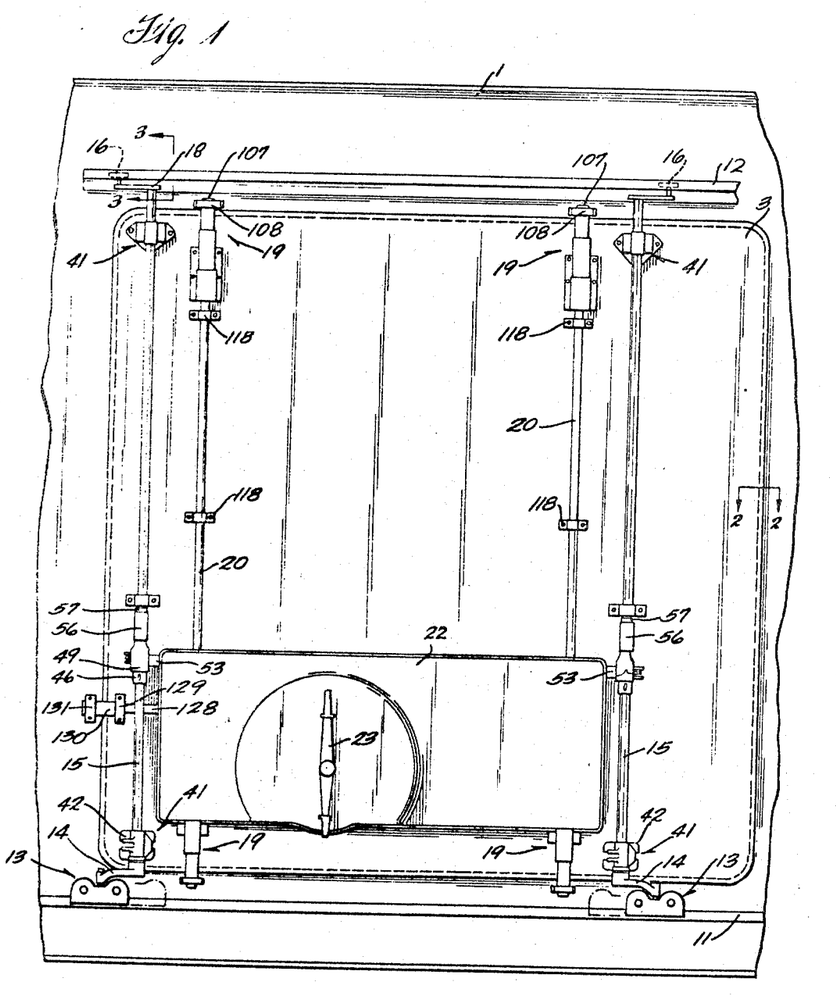
FIGURE 1 is a fragmentary side elevation of a railway car showing the door construction of the invention as associated with the car.

The door 3 is mounted for sliding movement along the side wall of the car 1 on a lower guide rail 11 which is secured to the side wall of the car 1 below opening 2 and an upper guide track 12 is mounted on the side wall of the car 1 above the opening 2. As shown generally in FIG. 1, a pair of roller assemblies 13 are mounted for movement on the lower rail 11, and each roller assembly is carried by one end of a crank arm 14 while the other end of each crank arm is connected to a vertical rod 15. To guide the upper end of door 3 in sliding movement along the side wall of the car, rollers 16 engage the flange 17 of the track 12 and each roller 16 is connected to one end of a crank arm 18. The crank arms 18 are secured to the upper ends of the vertical rods 15. By rotating the vertical rods 15, the corresponding crank arms 14 and 18 will be pivoted about the axes of the rods 15 to thereby move the door 3 laterally in and out of the opening 2.

To lock the door in the closed position a plurality of locking units, indicated generally by 19, are connected to vertical rods 20 and an operating mechanism 21 located within the cover 22 attached to the outer surface of the door is operably connected to both the rods 15 and rods 20. The operating mechanism is actuated by rotating a handle 23 and rotation of the handle acts through the operating mechanism 21, as will be hereinafter described, to rotate the rods 15 to thereby move the door laterally with respect to the opening and to move the rods 20 vertically to move the locking members in and out of locking engagement.

Figures 3, 4:
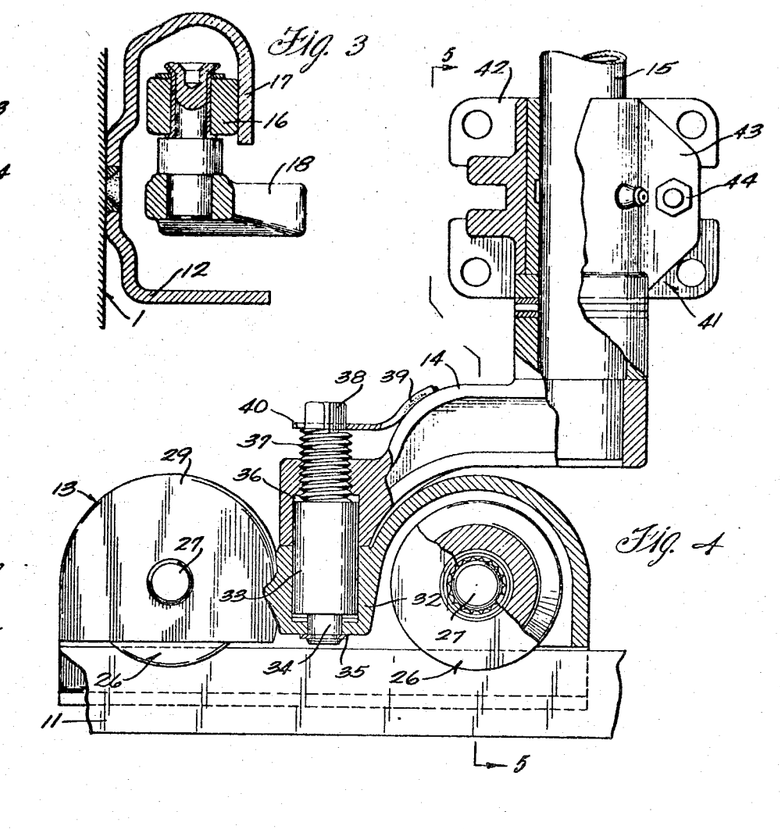
FIG. 3 is a section taken along line 3—3 of FIG. 1 and showing the connection of the door to the upper track.
FIG. 4 is an enlarged plan view of the crank arm and roller assembly with parts broken away in section.
Figure 5:
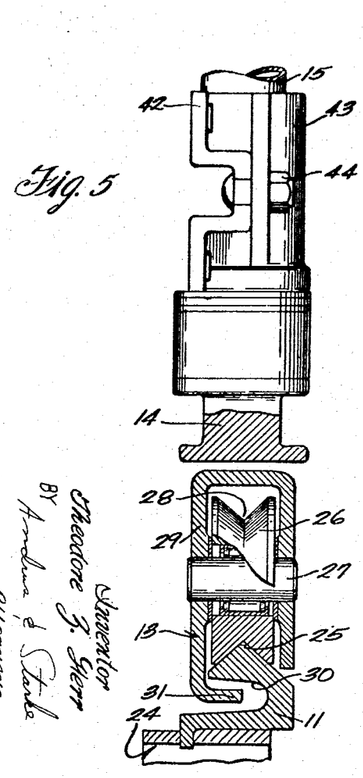
FIG. 5 is a view taken along line 5—5 of FIG. 4.

Referring to FIGS. 4 and 5, the rail 11 is supported on a bracket 24, which extends outwardly from the car 1 and the upper edge 25 of the rail 11 is generally V-shaped in cross section.

Each roller assembly 13 includes a pair of rollers 26 which are mounted on shafts 27. Rollers 26 are provided with peripheral grooves 28 which receive the V-shaped upper edge 25 of the track 11. The rollers 26 of each roller assembly 13 are housed within a carriage 29 and the shafts 27 are journalled in the opposed side walls of the carriage.

To prevent displacement of the roller assemblies 13 from the rail 11, the rail is provided with a longitudinally extending groove or recess 30 and a bent lip or flange 31 on the inner wall of the carriage 29 is located within the groove. The co-operation of the lip 31 with the groove 30 prevents the roller assemblies 13 from jumping the rail 11.

The central portion of the carriage 29 defines a socket 32 and a pin 33 is disposed within the socket 32. The lower end 34 of the pin has a reduced diameter and extends through an opening in the carriage and is retained within the opening by a lock washer 35. As shown in FIG. 4, pin 33 extends within a recess 36 in crank arm 14 and the upper portion 37 of the pin has a reduced diameter and is threaded within an opening in the crank arm 14. The upper end 38 of the pin is squared for wrench application. To prevent the pin 33 from unthreading, a keeper strip 39 is welded to the upper surface of crank arm 14 and the lower end 40 of strip 39 is forked and engages the end 38.

The upper end of each crank arm 14 is secured to the lower end of the vertical rod 15 and rods 15 are journalled for rotation within bearing assemblies 41 mounted on the outer surface 6 of the door 3. Each bearing assembly 41 includes a base plate 42 secured to the door face 6 and an outer member 43 which is secured to inner member 42 by a series of bolts 44.

As previously mentioned, each of the vertical rods 15 is rotated to pivot the crank arms 14, by an operating mechanism, indicated generally by 21, and located within the cover plate 22. As the action involved in rotating each of the rods 15 is identical, but opposite, the structure for rotating only one of the rods will be described.

Figure 6:
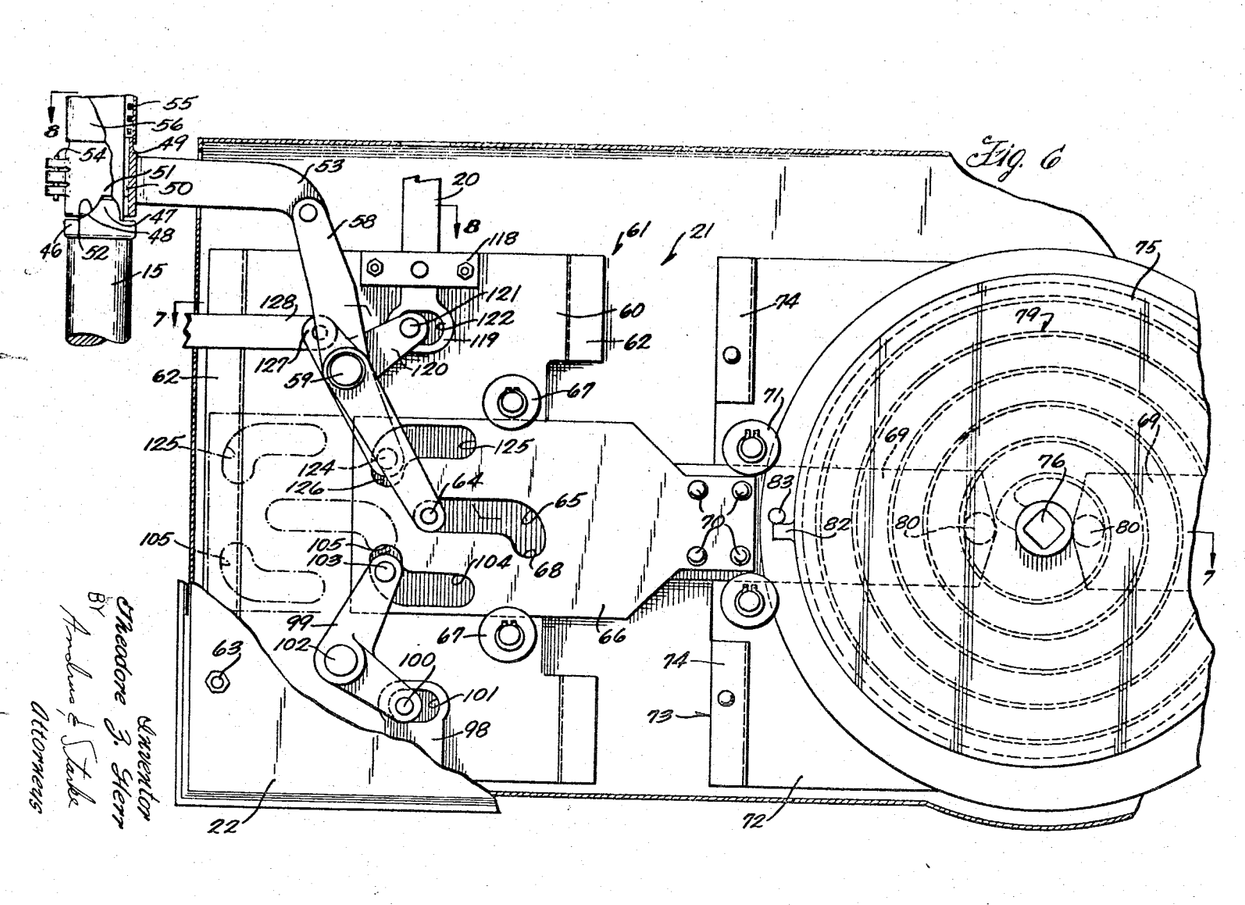
FIG. 6 is an enlarged plan view of the door of the invention with parts broken away and showing the operating mechanism.
Figure 8:
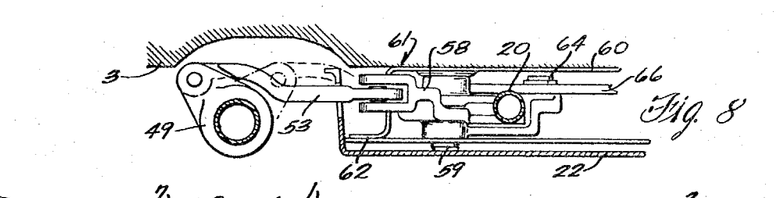
FIG. 8 is a section taken along line 8—8 of FIG. 6.

The rods 15 are connected to the operating mechanism 21 through an overload protection unit which prevents excessive torque from being applied to the crank arms 14 and 18 after the door 3 is in the closed position. The overload protection unit, as shown in FIG. 6, includes a collar 46 which is secured to the rod 15 and each collar is provided with a pair of opposed, upwardly extending projections 47 having inclined surfaces 48. A sleeve 49 is journalled around the rod by a bearing 50 and sleeve 49 is provided with a pair of recesses 51 having inclined surfaces 52 which complement and engage the inclined surfaces 48 on the collar 46. A crank arm 53 is connected to the sleeve 49 by a pin 54 and linear movement of the arm 53 is adapted to rotate the sleeve.

To urge the inclined surfaces 52 downwardly against the corresponding inclined surfaces 48, a coil spring 55 is located within a housing 56 and the lower end of the spring bears against the sleeve 49 while the upper end of the spring bears against a collar 57 fixed to the rod 15.

As previously mentioned, linear movement of the rod 53 will rotate the sleeve 49 and thereby rotate the rod 15 through the connection of the inclined surfaces 48 and 52, to thereby pivot the crank arms 14 and 18 and move the door laterally within the opening. When the door moves into the opening, the gasket 10 will engage the door frame member 5 and the compressibility of the gasket is correlated with the force of spring 55 so that the forces required to fully compress the gasket 10 is greater than the force exerted by spring 55, with the result that the driving connection of inclined surfaces 48 and 52 will slip or disengage before the door is in its fully closed or gathered position to prevent overloading of the rods 15 and the bell crank drive mechanism. The overload unit will also function to disengage the drive if the door, for some reason, is unable to move when the operating handle is rotated.

As best shown in FIG. 6, the inner end of the arm 53 is pivotally connected to the upper end of a bell crank 58 which is pivotally connected by pin 59 to the web portion 60 of channel plate 61. The flanges 62 of channel member 61 are connected to the cover plate 22 by a series of bolts 63.

The lower end of the bell crank 58 carries a roller 64 which is adapted to ride within a slot 65 formed in a slide plate 66 mounted for sliding movement parallel to the outer surface 6 of the door 3. To support the slide plate 66 for sliding movement a pair of guide rollers 67 are mounted on the web portion 60 of channel plate 61 and engage the upper and lower edges of the slide plate 66.

When the roller 64 rides within the outer straight portion of slot 65, the bell crank 58 will not pivot. Thus, when the slide plate 66 is moved from the solid line position to the phantom line position shown in FIG. 6, the roller 64 will initially ride in the straight portion of slot 65 and then will move downwardly into the curved end 68 of the slot causing the bell crank 58 to pivot about the connection 59 to thereby move the arm 53 and rotate the rods 15 to move the crank arms 14 and 18 and move the door laterally outward of the opening 2 in the side wall of the car. When the slide plate 66 is moved in the opposite direction, to the right as shown in FIG. 6, the roller 64 moves out of the bent end 68 of the slot and the crank arms 14 and 18 are pivoted in the opposite direction to move the door laterally inward into the opening 2 in the car.

The slide plate 66 is moved in the reciprocating path by a spiral cam mechanism. As best shown in FIG. 6, the end of the slide plate 66 is connected to a slide 69 by a series of rivets 70. Guide rollers 71 are located along the upper and lower edges of slide 69 and serve to guide the slide 69 in horizontal sliding movement. The guide rollers 71 are journalled on the web portion 72 of a channel shaped support plate 73. Support plate 73 is provided with a series of flanges 74 and the cover plate 22 is connected to the flanges by bolts.

As previously mentioned, the slide plate 66 is moved in horizontal reciprocating movement by rotation of a spiral cam 75 which is mounted on a horizontal shaft 76. Shaft 76 is journalled for rotation within an opening in bearing plate 77 secured to the inner surface of cover 22 and within a bearing 78 mounted within an opening in the web portion 72 of channel plate 73. The shaft 76 is rotated by means of a handle 23 which is attached to the outer end of the shaft. Under normal practice, a suitable locking member, not shown, is secured to the handle and when locked, prevents the handle from being rotated.

The cam 75 is provided with a spiral groove 79 and a cam follower 80, mounted on the end of the slide 69, is adapted to move within the groove 79 as the cam 75 is rotated through operation of the handle 23. As shown in FIG. 6, two followers 80 are mounted within the spiral groove 79, with each follower connected to a slide plate 69 so that movement of each slide plate will act through the bell crank mechanism previously described to operate the crank arms 14 and 18 for the doors.

To guide the slide 69 in a sliding movement, a wear plate 81 made of nylon or other material having a low coefficient of friction is secured to the undersurface of the slide plate 69 and is adapted to ride against the web portion 72 of channel plate 73 as the slide 69 is moved horizontally by rotation of the spiral cam 75.

To provide a positive stop for the closed position of the doors, a lug 82 is secured to the outer periphery of the spiral cam 75 and is adapted to engage a stud or projection 83 on slide plate 69 when the slide plate has been moved inwardly to a predetermined position. As the handle 23 is rotated and the follower 80 moves toward the center of the spiral groove, the slide plate 69 will be moved to the right, as shown in FIG. 6, to a position where the lug 82 will engage the projection 83 and thereby stop further rotation of the spiral cam.

As shown in FIG. 6, the door is closed and in the locked position. At this time, the roller 64 is at the outer end of the slot 65 and the leg 82 is in engagement with the projection 83 on slide 69. When it is desired to open the door, the cam 75 is rotated counterclockwise through operation of the handle 23. Counterclockwise movement of the spiral cam will move the plate 66 to the left, as shown in FIG. 6, so that the roller 64 will move along the straight section of slot 65 and eventually into the curved end 68 of the slot. When the roller 64 moves into the curved end 68, it will pivot the bell crank 58 to thereby move the door laterally outward of the opening in the car. By rotating the handle 23 clockwise the action is reversed and the door 3 is moved laterally inward into the opening 2.

Figure 10:
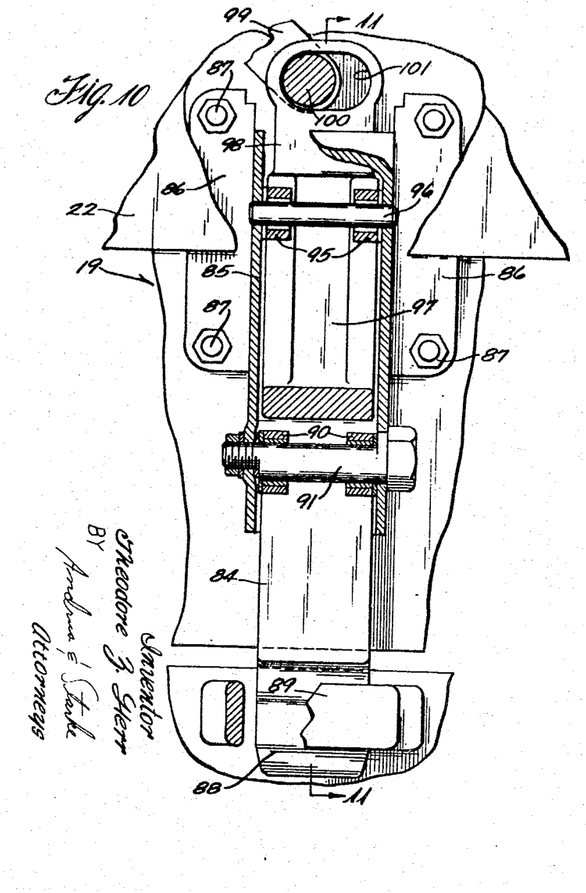
FIG. 10 is a plan view with parts broken away in section showing the locking bolt construction for the bottom of the door.
Figure 11:
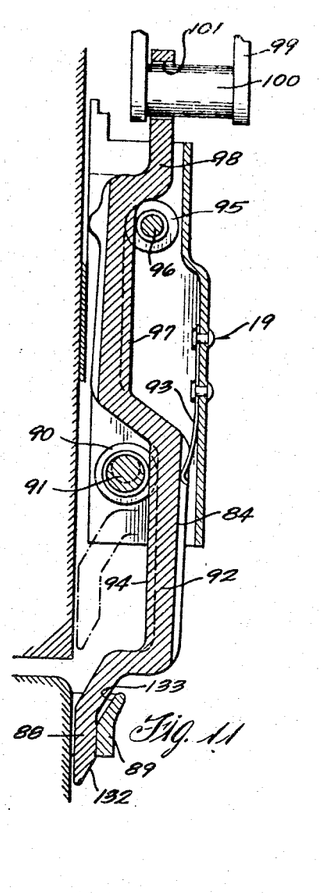
FIG. 11 is a section taken along lines 11—11 of FIG. 10 and showing the lower bolt in the locked position.
Figure 12:
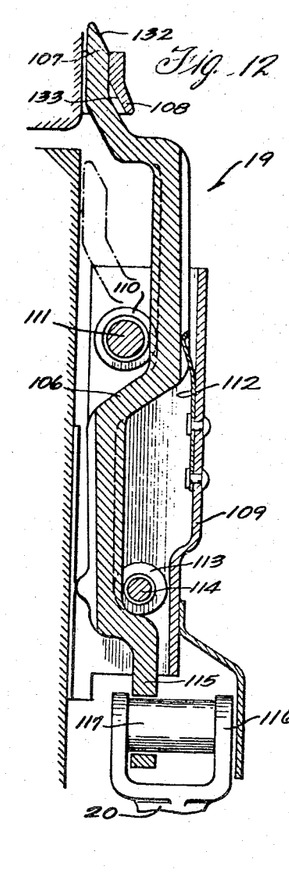
FIG. 12 is a view similar to FIG. 11 showing the upper bolt in the locked position.

As previously mentioned, the locking units 19, which serve to gather and lock the door 3 within the opening 2 in the wall of the car after it has been moved laterally inward within the opening, are also activated by the spiral cam operating mechanism 21. As shown in FIGS. 10–12 the lower locking units 19, which are located along the bottom edge of the door, each include a bolt 84 which is slidable within a housing 85. The housing 85 is provided with a pair of side flanges 86 which are secured by bolts 87 to the outer face 6 of the door 3.

To lock the door 3 to the car, the lower end 88 of each bolt 84 is adapted to engage a bracket 89 mounted on the car beneath the opening 2. The bolts 84 are guided for movement within the housing 85 by a pair of rollers 90 which are mounted on an eccentric shaft 91. Rollers 90 are adapted to ride against an offset section 92 of bolt 84, and the offset section 92 is urged into engagement with the rollers 90 by a leaf spring 93. The rollers 90 are adapted to ride on either side of a central ridge 94 which extends longitudinally along the inner surface of the section 92. By rotating the eccentric shaft 91, the position of the offset section 92, with respect to the outer surface 6 of the door, can be varied to thereby permit the unit to be used with various types of railway cars. For example, in some situations, the relative thicknesses of the door and car wall may vary depending on the particular type of railway car and the use of the eccentric shaft 91 accommodates slight variations in relative thickness by enabling the bolts 84 to be moved laterally with respect to the door.

In addition to the rollers 90, a second pair of rollers 95 are mounted on a pin 96 and are adapted to ride along the upper portion of the bolt 84 on either side of a central ridge 97.

The upper offset end 98 of each lower bolt 84 is pivotally connected to the lower end of a bell crank 99. As best shown in FIGS. 10 and 11, a pin extends through aligned openings in the lower forked end of the crank 99 and through a slot 101 in the end of the bolt 84. The connection of the bolt end 98 to the crank 99 by means of the pin 100 enables the bolt to move laterally inward and outward along the pin 100 to thereby aid in accommodating variances between the outer surface of the door and the outer surface of the car wall in various types of railway cars. For example, if the outer face of door 3 is not flush with the outer surface of the wall of the railway car and is located inward of the car wall, a spacer can be inserted between the locking member and the door face 6 to move the bolt 84 laterally outward, and the upper end 98 of the bolt can float with respect to the lower forked end of crank arm 99 to accommodate the spacer.

As best shown in FIG. 6, the bell crank 99 is pivotally connected to the web 60 of channel plate 61 by a pin 102 and the upper end of bell crank 99 carries a roller 103 which is adapted to ride in a slot 104. The end of slot 104 is curved upwardly, as indicated by 105. When the plate 66 is moved to the left, as shown in FIG. 6, the roller 103 will initially ride within the curved portion 105 of the slot, thereby pivoting the bell crank 99 and moving the locking bolt 84 upwardly out of locking engagement with the bracket 89. Further movement of the plate 66 will cause the roller 103 to move within the straight portion of slot 104, and movement of the roller within the straight portion of the slot will not cause any further pivotal movement of the bell crank 99.

The upper locking units 19, located at the upper end of the door, are similar to those at the lower end of the door and each locking unit includes a locking bolt 106 having an upper end 107 which is adapted to engage a bracket 108 mounted on the car door above the opening 2. The bolts 106 are adapted to slide within housings 109, similar in structure to housing 85.

The upper locking bolt 106 is provided with an offset section which rides against a pair of rollers 110 mounted on an eccentric shaft 111, similar to the manner in which rollers 90 are mounted on shaft 91. The offset portion of bolt 106 is urged into contact with the rollers 110 by a leaf spring 112.

In addition to the rollers 110, a second pair of rollers 113 serve to guide the bolt 106 for sliding movement within the housing. Rollers 113 are similar in structure to rollers 95 and are mounted for rotation on a shaft 114.

The lower end 115 of bolt 106 is connected to a yoke 116 by a pin 117 so that the lower end 115 can freely move in a lateral direction with respect to the yoke 116 to permit the bolt 106 to adjust for variations in thickness between the door and the side wall of the car.

The yokes 116 are connected to the vertical rods 20 and the rods 20 are mounted for sliding movement within a series of guide brackets 118 secured to the outer surface of the door. To move the rods 20 vertically to engage and release the locking bolts 106, the lower end 119 of rod 20 is pivotally connected to the upper end of a bell crank lever 120 by a pin 121 which extends through a slot 122 in the end 119 of the rod. Bell crank 120 is mounted for pivotal movement on pin 59 secured to the web portion 60 of the channel plate 61 and the lower end of bell crank 120 carries a roller 124 which is adapted to ride in a slot 125. The outer end of slot 125 is curved as indicated by 126.

The locking bolt assemblies 19 at the upper end of the door are in the locked position, engaged with the brackets 108, when the operating mechanism is positioned as shown in FIG. 6. As the spiral cam mechanism is rotated, the slide plate 66 is moved to the left in FIG. 6 causing the rollers 124 to move out of the bent ends 126 of the slot, thereby pivoting the bell crank 120 to move the rods 20 downwardly and release the locking bolts 106. Continued movement of the slide plate 66 results in the roller 124 moving within the straight portion of slot 125 and no further pivotal movement of the bell crank 120 will occur.

Figure 9:
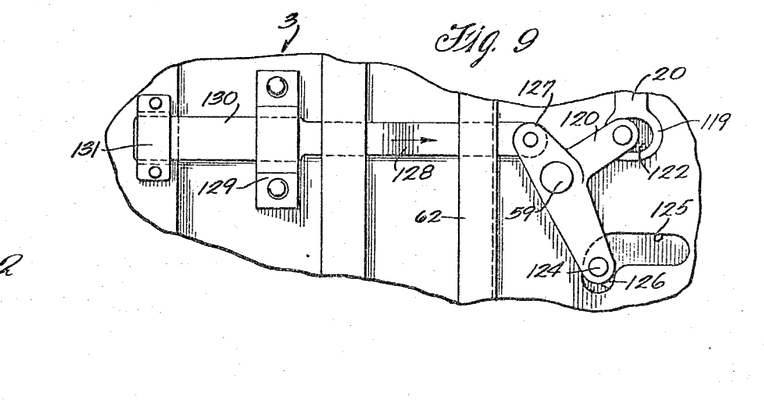
FIG. 9 is a fragmentary plan view showing a locking bolt construction for the side of a car door.

When the door operating mechanism is used with a grain car which contains grain or other bulk material, an additional locking element is normally employed along the side edge of the door to prevent the material from bulging the door outwardly. In this regard, a finger 127 is formed integrally with the bell crank 120 and an arm 128 is pivotally connected to finger 127 and extends horizontally through the flange 62 of the channel plate 61. The arm 128 is guided for sliding movement within a guide bracket 129 mounted on the outer surface of the door and the outer end of the arm carries a bolt 130 which is adapted to be received in a bracket 131 in the door frame to lock the door to the frame. As the bolt 130 is connected directly to the bell crank 120, the bolt 130 will be engaged and disengaged along with the engagement and disengagement of the locking bolts 106 at the top edge of the door.

As previously mentioned, the operating mechanism is shown in the locked position in FIG. 6. When it is desired to unlock the door, the handle 23 is rotated moving the spiral cam 75 counterclockwise and this will move the slide plate 66 to the left, as shown in FIG. 6. The initial movement of slide plate 66 will move the rollers 124 and 103 in the curved portions of the respective slots with the result that the bell cranks 99 and 120 are pivoted to release the locking bolts 84, 106 and the side bolts 130. Continued movement of the slide plate 66 will move the rollers 103 and 124 in the straight portions of the respective slots 104 and 125 so that the bell cranks 99 and 120 will not pivot any further. As the slide plate 66 approaches the end of its path of movement, the roller 64 on bell crank 58 will move into the curved end 68 of slot 65, thereby pivoting the bell crank 58 to pivot the crank arms 14 and 18 and thereby move the door laterally outward within the opening. With the door moved outwardly, the door can then be slid manually along the guide tracks to a position where the car can be loaded or unloaded.

To close the door the procedure is reversed, with the initial movement of the slide plate 66 causing the bell cranks 58 to pivot the crank arms 14 and 18 to move the door 3 laterally inward. The pivotal movement of the cranks 14 and 18 will not move the door into flush alignment within the door frame, for the door gasket 10 will engage the door frame and as the force required to fully compress the gasket is greater than the force of spring 55 of the overload unit, the overload unit will disengage to prevent further torque from being applied to the crank arms. Subsequent movement of the slide plate 66 will then cause the rollers 103 and 124 to move into the curved portions of the respective grooves to thereby pivot the bell cranks 99 and 120 and move the locking bolts 84 and 106 into locking engagement with the respective brackets. To wedge or gather the door inwardly into proper locking position, the locking bolts 84 and 106 are provided with tapered ends 132 which initially engage taper surfaces 133 on the brackets 89 and 108, respectively. The engagement of the tapered ends 132 with the tapered surfaces 133 on the locking brackets provides a wedging effect to gather the door laterally inward into proper alignment within the door opening and compress the gasket 10.

FIGS. 13 through 23 illustrate a modified form of the invention. As in the first embodiment, crank arms 14 carry roller assemblies 13 that ride on rail 11, while upper crank arms 18 are connected to rollers 16 that ride on upper track 12. In this embodiment the crank arms 14 and 18 are each provided with extensions 134 which are received within the openings in tubular housing members 135. Each housing 135 is provided with a pair of side flanges 136 which are secured to the outer surface of the door by suitable bolts.

The crank actuating mechanism is identical for both the lower crank arms 14 and the upper crank arms 18 and therefore only the mechanism associated with the lower crank arms 14 will be described in detail.

Figures 17, 18, 19:
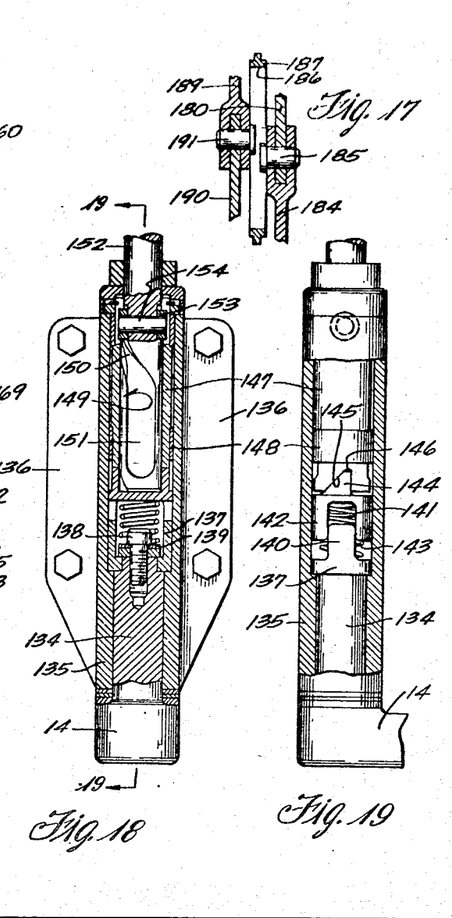
FIG. 17 is a section taken along lines 17—17 of FIG. 14 and showing the sliding attachment of the toggle arms to the hub.
FIG. 18 is a vertical section of the overload protection unit associated with the crank arms of the door illustrated in FIG. 13.
FIG. 19 is a view taken along lines 19—19 of FIG. 18.

As illustrated in FIGS. 18 and 19, a collar 137 is located within the housing 135 and is secured to the upper end of the extension 134 by a bolt 138. The lower end of the collar 137 bears against the shoulder formed in the housing and prevents the crank arm 14 from dropping out of the housing. Washer 139 is located between the head of the bolt 138 and the upper end of the extension 134.

The collar 137 is provided with a pair of opposed upwardly extending lugs 140 which are slidably mounted within recesses 141 formed in collar 142. The connection between the lugs 140 and recesses 141 permits axial movement between the members, yet provides a positive rotational connection between the collar 137 and the collar 142.

A spring 143 is located within the interior of collar 137 and bears between the washer 139 and the upper end of the collar 142, thereby urging the collar 142 upwardly within the housing 135.

The collar 142 is provided with a pair of opposed lugs 144 having inclined edges 145 that are in engagement with corresponding inclined edges of recesses 146 formed in the bottom end of a cam cylinder 147. Cam cylinder 147 is journalled for rotation within the housing 135 by a bearing 148 and is provided with cam slots 149 while the lower end of the cam slot is straight as indicated by 151.

The cam cylinder 117 serves to transform linear motion into rotary motion for the crank extension 134 to thereby pivot the crank arm 14 about the axis of the extension 134. As shown in FIGS. 18 and 19, a rod 152 extends within an opening in the upper end of the housing 135 and carries a pair of rollers 153 adapted to ride in the cam slots 149. The rollers 153 are journalled on shaft 154 which extends transversely through the lower end of the rod 152. Rod 152 is adapted to be moved linearly, and as the rod is moved downwardly from the position shown in FIG. 18, the rollers 153 ride in the spiral end 150 of cam slot 149, thereby serving to rotate the cam cylinder 147 and this rotation is transmitted through the couplings 142 and 137 to thereby rotate the crank arms 14. Continued downward movement of the rod 152 moves the rollers 153 into the straight portion 151 of the spiral cam, and when the rollers 153 ride downwardly within the straight portion 151, no further rotation of the cam cylinder 147 and crank arm 14 will result.

As in the case of the first embodiment, the engagement of the inclined edge 145 on lug 144 with the inclined edge of recess 146 serves as an overload protection which prevents damage to the operating mechanism in instances where the door cannot be moved laterally into the closed position, or in instances of sudden stopping or starting where the door pivots by inertia with respect to the crank arms. If the crank arms cannot be pivoted, rotation of the cam cylinder 147 will cause the inclined edge of recess 146 to ride upwardly on the inclined edge 145 of lug 44 against the force of spring 143 to thereby provide an overload protection which will prevent transmission of the torque to the crank arms. Similarly, if the crank arms 14 are pivoted by sudden movement of the arm, this rotation of crank arm extensions will be taken up by the overload unit so that the rotational force will not be transmitted back to the operating mechanism.

The ends of the rods 152 are connected by a yoke 155 to vertical rods 156, and the rods 156 which are associated with the crank arms 18 at the upper end of the door are guided for vertical movement within guide brackets 157 attached to the outer surface of the door.

Rods 156 are adapted to be moved vertically to pivot the crank arms by a toggle mechanism, indicated generally by 158, and housed within a cover plate 159 secured to the outer surface of the door.

Figure 13:
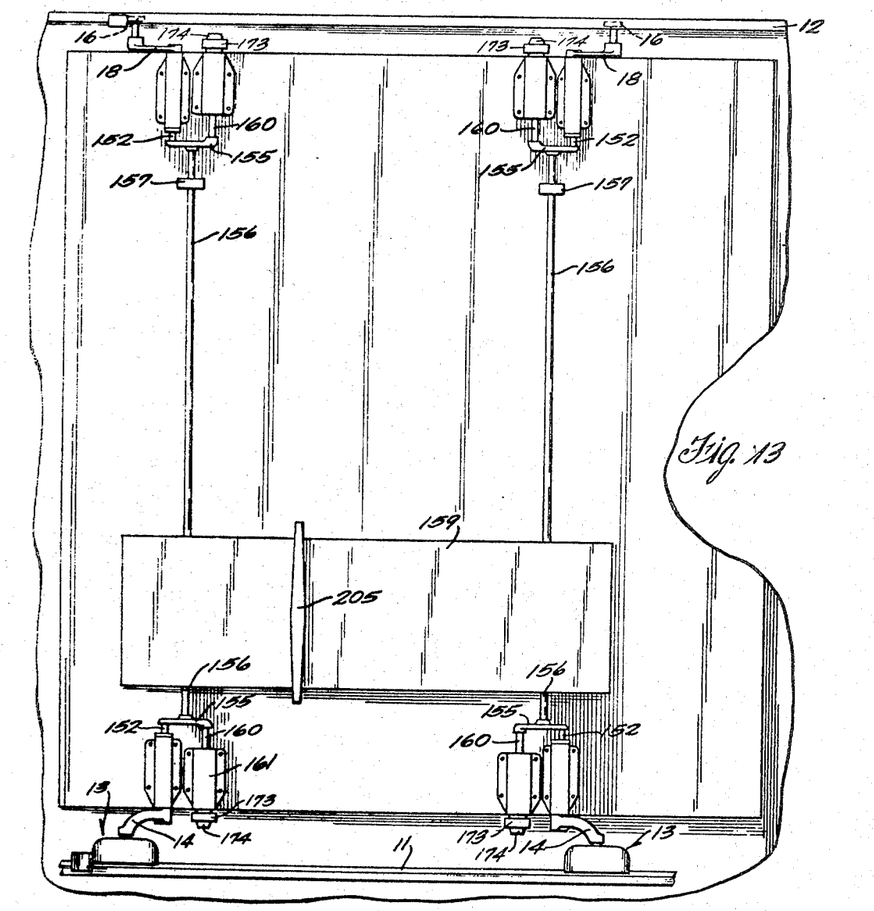
FIG. 13 is a side elevation of a railway car utilizing a modified form of the door construction of the invention.

Movement of the rods 156 also acts to engage and release locking bolts at the upper and lower edges of the door. As best shown in FIG. 13, each yoke 155 also carries a rod 160 which extends within an opening in the upper end of a housing 161 having side flanges 162 connected to the outer surface of the door by bolts 163. The lower end of rod 160 is connected to a yoke 164 by a pin 165 and the lower end 166 of yoke 164 is pivotally connected by a pin 167 to the upper end of a locking bolt 168 which is mounted for movement within the housing 161.

Figures 20, 21, 22:
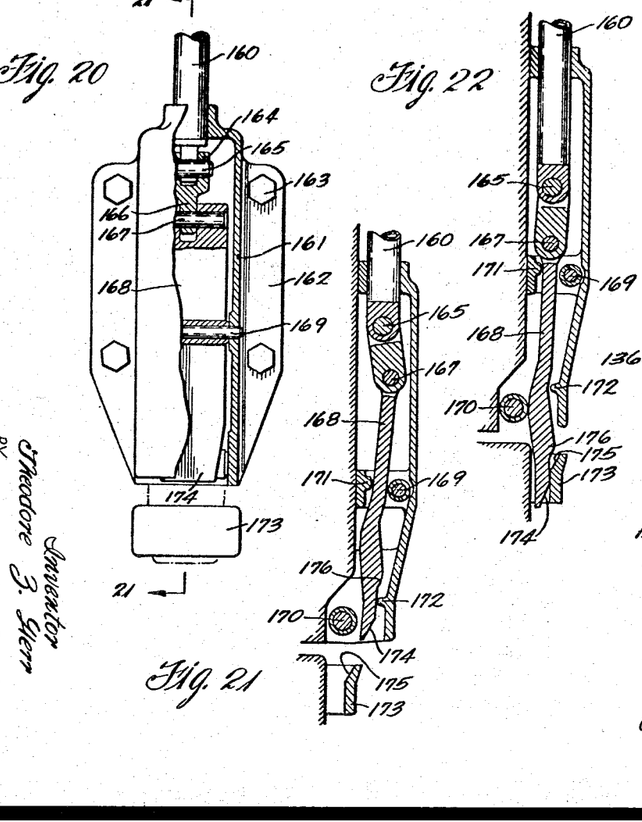
FIG. 20 is a plan view with parts broken away in section of a lower locking bolt for the door construction shown in FIG. 13.
FIG. 21 is a section taken along line 21—21 of FIG. 19 and showing the locking bolt in the unlocked position.
FIG. 22 is a view similar to FIG. 21 showing the locking bolt in the locked position.

To guide the bolt 168 in movement within the housing, a pair of rollers 169 and 170 are journalled within the housing on opposite sides of the bolt 168. Mounted in opposition to the roller 169 is a ridge 171, while a second ridge 172 is formed in the housing 161 and is located generally opposite the roller 170. The lower end of each bolt is adapted to be moved into locking engagement with a bracket 173 mounted on the side wall of the car adjacent the door opening. As in the case of the first embodiment, the end of each bolt 168 is provided with a tapered surface 174 which is adapted to wedge against a tapered surface 175 formed on the bracket 174 to thereby wedge the door inwardly within the opening in the car.

FIG. 20 shows the locking bolt 168 in the unlocked or released position. As the rod 160 is moved downwardly, the bolt 168 will ride downwardly over the rollers 169 and 170 until the lower end 174 engages the tapered surface 175 on bracket 173. Continued downward movement of the locking bolt 168 will wedge the end of the bolt within the bracket 173 to gather the door inwardly within the opening.

The bolt movement is provided with a double cam action. As the bolt 168 is moved downwardly, the shoulder or projection 176 on bolt 168, engages rib 172, thereby camming the bolt inwardly toward the door so that the end 174 of the bolt will engage the latch surface 175. A second camming action is provided as the inner surface of bolt 168 rides against the roller 170 and this second camming action multiplies the first, so that, in effect, an overall camming action is provided which is equivalent to that which could only be produced through the use of a considerably thicker bolt subjected to a single camming action. Thus, the construction of the invention provides a maximum camming action to bring the bolt into engagement with the latch with a minimum bolt thickness.

Figures 14, 15, 23:
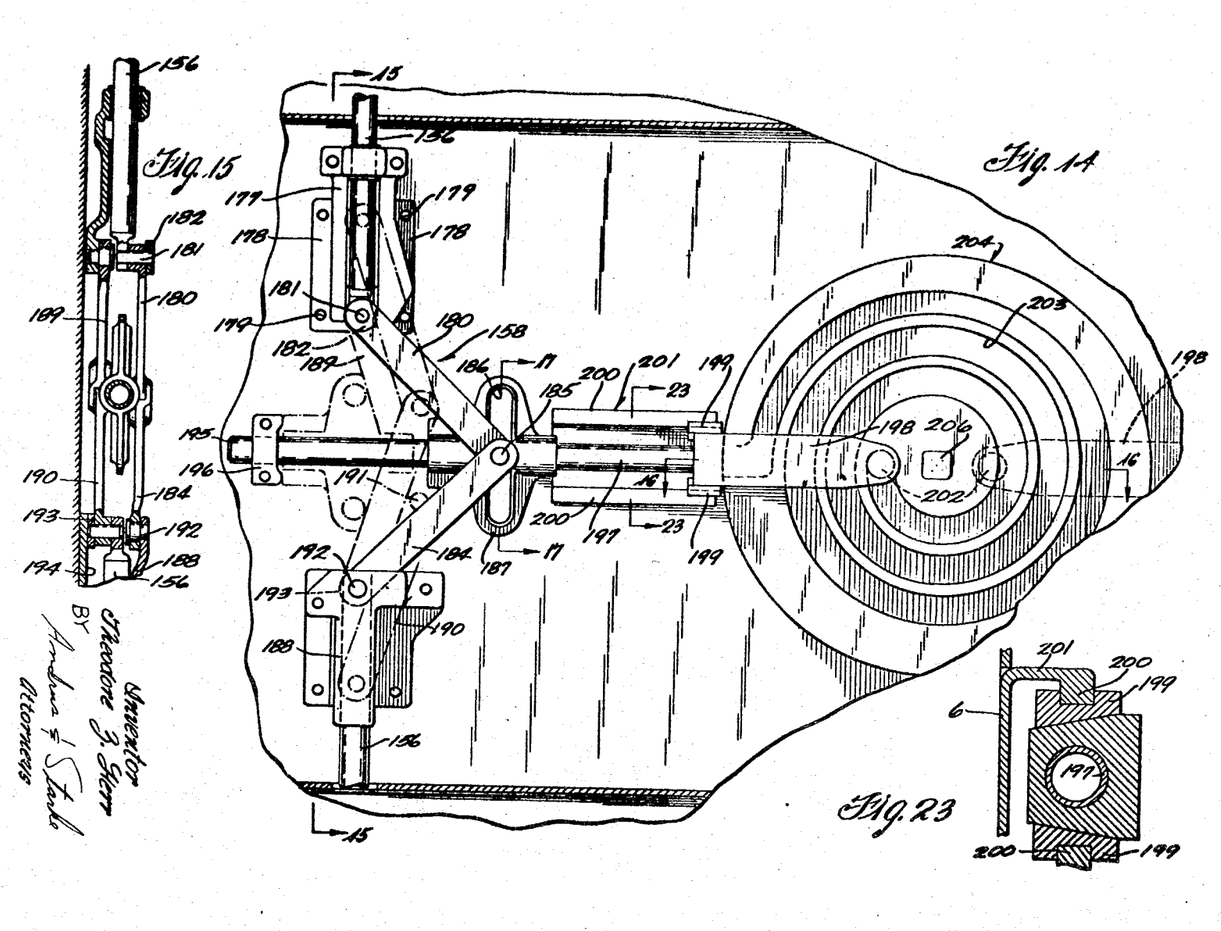
FIG. 14 is an enlarged fragmentary plane view with parts broken away in section showing the operating mechanism for the door illustrated in FIG. 13.
FIG. 15 is a section taken along line 15—15 of FIG. 14 and showing the toggle construction.
FIG. 23 is a section taken along line 23—23 of FIG. 14.

The upper actuating rods 156 are slidable within housings 177 mounted within the cover 159 on the outer face 6 of door 3. Each of the housings 177 is provided with a pair of side flanges 178 which are connected to the door face 6 by bolts 179.

The lower end of each of the upper actuating rods 156 is pivotally connected to a toggle arm 180 by a pin 181. In addition, a roller 182 is mounted on the pin 181 and is adapted to ride in a vertical track 183 formed in the housing 177.

The opposite or lower end of toggle arm 180 is pivotally connected to a toggle arm 184 by a pin 185 and, as is best shown in FIG. 17, the head of the pin 185 is adapted to slide within a vertical slot 186 formed in hub 187.

The lower end of toggle arm 184 is pivotally connected to the housing 188, which is similar in structure to housing 177, so that the lower end of toggle arm 184 is fixed with respect to the door 3.

The operating mechanism also includes a second pair of toggle arms 189 and 190. The upper end of toggle arm 189 is pivotally connected to housing 177 and the lower end of arm 189 is pivotally connected to arm 190 by a pin 191. The head of pin 191 rides within the slot 186 in hub 187, as shown in FIG. 17. The lower end of toggle arm 190 is pivotally connected by pin 192 to the upper end of the lower actuating rod 156. In addition, a roller 193, similar to roller 182, is mounted on pin 192 and is adapted to ride within a vertical track 194 formed in housing 188.

FIG. 14 shows the operating mechanism in the unlocked position. To pivot the crank arms 14 and 18 and move the locking bolts 168 into locking position, the hub 187 is moved to the left as shown in FIG. 14. As the lower end of arm 184 is fixed at pivotal connection 192, and as the upper end of arm 180 is free to move vertically, the arms 180 and 184 will move to an extended position, as shown by the phantom lines in FIG. 14, to thereby move the upper rod 156 upwardly. Pivot pin 185 will slide vertically upward within slot 186 to accommodate the extension of toggle arms 180 and 184. Similarly, movement of the hub 187 will extend the toggle arms 189 and 190, as shown by the phantom lines in FIG. 14, to move the lower rods 156 downwardly. The pivot pin 191 connecting arms 189 and 190 will slide vertically downwardly within the slot 186 to accommodate the extension of the toggle arms 189 and 190.

As previously described, vertical movement of rods 156 will act through yokes 155 to actuate rods 152 and 160. Initial movement of rods 152 will move rollers 153 into the spiral portion 150 of slot 149 to thereby pivot the crank arms 14 and 18 and move the door laterally into the opening. Continued movement of rods 152 will cause rollers to ride within the straight portions 151 of slots 149 and no further pivotal movement of the cranks 14 and 18 will occur.

The movement of rods 160 which actuate the locking bolts 168 is synchronized with the movement of rods 152, so that the locking bolts will not move into engagement with the locking brackets 173 until after the rollers 153 have moved out of the spiral portions 150 of slots 149. This insures that the door will be moved laterally into the opening in the car before the locking bolts are engaged.

To unlock the door, the action is reversed with initial movement of the actuating rods 156 functioning to release the locking bolts 168 and subsequently pivoting the crank arms 14 and 18 to move the door laterally outward of the opening in the car.

Hub 187 is connected to a horizontal rod 195 which extends through a stop bracket 196 mounted on door face 6. The bracket 196 provides a stop to limit the movement of the hub 187 and thereby preventing the toggle arms from being extended more than ⅛ over center. For grain cars, a slide bolt, similar to bolt 130, can be connected to rod 195, if desired, and the slide bolt will engage a bracket mounted on the car as the rod 195 is moved to the left in FIG. 14.

The opposite end of hub 187 is connected to a horizontal rod 197 which is secured to the outer end of a slide 198. Slide 198 carries guide bars 199 which are adapted to ride on the downwardly bent flanges 200 of a channel bracket 201 mounted on door face 6. The engagement of the guide bars 199 with flanges 200 guides the slide 198 in horizontal linear movement.

As in the case of the first embodiment, the slide 198 is moved linearly by a spiral cam mechanism. A cam follower 202 is connected to the inner end of the slide 198 and follower 202 is adapted to ride within a spiral groove 203 formed in the cam 204. As in the case of the first embodiment, the spiral cam 204 is adapted to actuate a pair of toggle mechanisms 158, only one of which is shown in FIG. 14. Thus, both the outer and inner surface of cam 204 is provided with a spiral groove 203 and a follower 202 rides in each groove 203.

To rotate the cam plate 204, a handle 205 is mounted on the square outer end 206 of a shaft 207 which is connected centrally to the cam 204. The handle is located on the outside of the cover 159 and by rotating the handle, the cam plate 204 is correspondingly rotated to move the followers 202 in the grooves 203 and thereby move the slide plates 198. In practice a suitable locking mechanism, not shown, is associated with the handle 205 to prevent tampering with the same.

Figure 16:
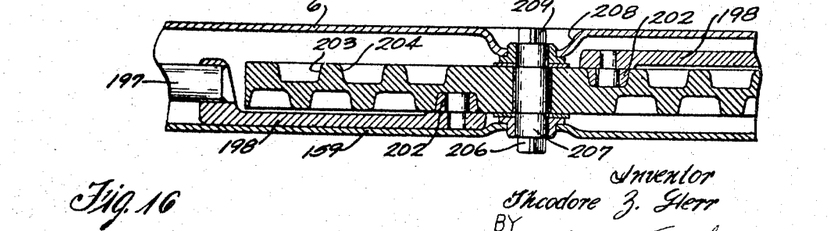
FIG. 16 is a section taken long lines 16—16 of FIG. 14 and showing the spiral cam arrangement.

As shown in FIG. 16, the door face 6 is recessed, as indicated by 208, and the generally square inner end 209 of the shaft 207 is located within the recess. By providing a suitable opening in the door 6, a wrench or other operating tool can be engaged with the end 209 of the shaft to rotate the cam plate and open the door from the inside of the car if desired.

Figure 24:
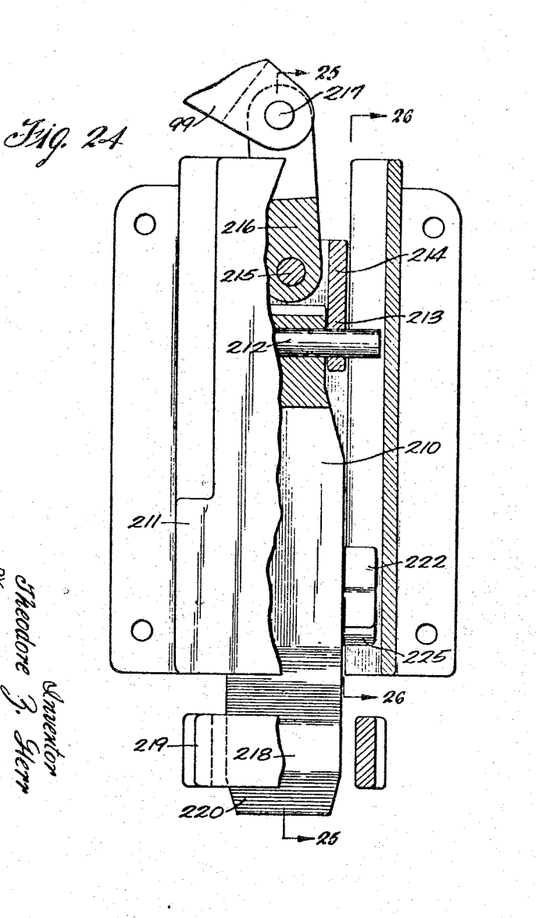
FIG. 24 is a side elevation with parts broken away in section of a modified type of locking bolt.
Figure 25:
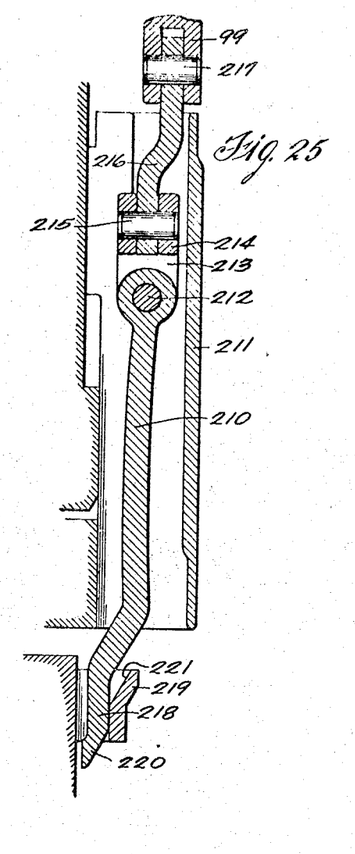
FIG. 25 is a section taken along line 25—25 of FIG. 24.
Figure 26:
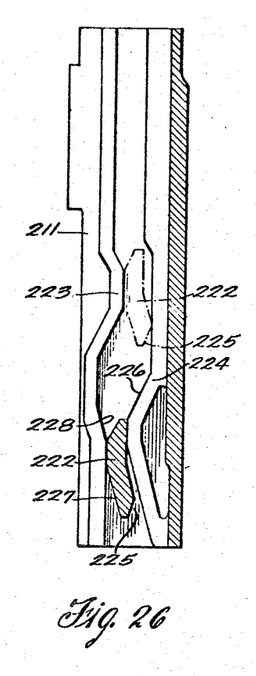
FIG. 26 is a section taken along line 26—26 of FIG. 24.

FIGS. 24–26 illustrate a modified form of locking bolt construction. While FIGS. 24–26 show only the locking bolts at the lower edge of the door, the bolts at the upper edge of the door are identical in structure and operation. In this embodiment, the bolts 210 are guided for sliding movement within housings 211 mounted on the outer face of the door 3. The upper end of each bolt 210 is pivotally connected by pin 212 to the lower forked end 213 of link 214, while the upper end of the link is pivotally connected by pin 215 to the lower end of a link 216. To move the bolt 210 within the housing, the upper end of link 216 is pivotally connected by pin 217 to the lower end of bell crank 99.

The lower end 218 of bolt 210 is adapted to be received within a locking bracket 219 secured to the car wall 1 and, as in the case of the previous embodiments, the lower edge of the bolt is tapered, as indicated by 220, and is designed to wedge against a correspondingly tapered surface 221 on bracket 219 to aid in gathering the door inwardly as the bolt moves downwardly.

To provide a camming action for the bolt operation, a projection or shoulder 222 extends outwardly from each side edge of the bolt 210. The shoulders 222 are adapted to slide between an inner cam member 223 and an outer cam member 224. In FIG. 26, the phantom lines indicate the location of the cam shoulders 222 when the bolt 210 is in the upper unlocked position. As the bolt moves downwardly through pivotal movement of bell crank 99, the tapered outer edge 225 of shoulder 222 engages the sloping surface 226 of outer cam member 224 to move the bolt 210 laterally inward toward door 3 and enable the lower end 218 of the bolt to get position to enter the locking bracket 219. Continued downward movement of the bolt 210 will bring the surface 227 of cam shoulder 222 into engagement with the sloping surface 28 of inner cam member 223 and as surface 227 of shoulder 222 rides along the sloping surface 228, the door is wedged inwardly to provide a second gathering action to fully compress the door gasket 10. Thus, the bolt construction of FIGS. 24–26 provides a maximum overall camming action with a minimum bolt thickness to gather the door 3 into the opening 2 and compress the door gasket 10.

The door construction of the invention serves to move the door laterally into the opening in a railway car, as well as lock the door in position within the opening with a single movement of the operating mechanism. The operating mechanism is programmed so that the door is initially moved laterally into the opening and then the locking mechanism is then actuated to lock the door in position. On opening of the door, the procedure is reversed so that rotation of the handle initially releases the locking members and then moves the door laterally outward of the opening.

The spiral cam drive mechanism is compact and projects only about 2½ inches from the outer surface of the door well within the maximum width requirements for railway cars. The spiral drive mechanism has the additional advantage of not being subjected to springback so that a force applied to the crank arms or door will not rotate or whip the handle back in the opposite direction.

The door operating mechanism is extremely versatile and can be used with various types of doors and railway cars. To accommodate variances in relative thickness between the door and the side wall of the car, a provision is made to vary the lateral position of the locking assemblies with respect to the outer face of the door.

While the above description is directed to the use of the door operating mechanism for a railway car door, it is contemplated that the operating mechanism can also be employed for operating doors used in other applications.

Various modes of carrying out the invention are contemplated as being within the scope of the following claims particularly pointing out and distinctly claiming the subject matter which is regarded as the invention.

I claim:

1. A slide bolt unit for locking a door in an opening, comprising a housing mounted on the door face, a bolt slidably disposed within said housing, latch means located on the door frame and disposed to receive said bolt to lock the door within said opening, means for guiding the bolt in sliding movement within the housing, eccentric means engageable with the bolt, and means for rotating the eccentric to thereby vary the lateral position of said bolt from said door face.

2. The apparatus of claim 1, in which said eccentric means comprises an eccentric shaft, and roller means mounted on said eccentric shaft and disposed in engagement with said bolt.

3. The structure of claim 2, and including resilient means for urging the bolt against said roller means.

4. The unit of claim 1, and including operating means operable in a fixed plane parallel to the door face, and connecting means connecting said operating means to said bolt and arranged to permit free lateral movement of the bolt in a direction toward and away from said door face.

5. A slide bolt unit for locking a door within an opening in a wall, comprising a housing mounted on the outer face of said door, a bolt slidably disposed within the housing, latch means located on the wall and disposed to receive one end of the bolt to lock the door within the opening, bolt operating means for moving the bolt within the housing to selectively engage and disengage said first end of the bolt with said latch means, and means for permitting free lateral movement of said second end of the bolt with respect to said operating means in a direction toward and away from the face of the door.

6. The structure of claim 5, in which said operating means includes a yoke having a pair of generally parallel arms, and a shaft extending between said arms, said second end of the bolt having an opening to receive said shaft whereby said bolt is freely slidable along said shaft between said arms.

7. A locking unit for locking a door member within an opening in a wall member, comprising a housing mounted on the outer surface of one of said members, latch means mounted on the other of said members, a bolt slidably disposed within the housing and having an outer end engageable with said latch means to lock the door within the opening, said bolt being movable between an unlocked and a locked position, first cam means operable in response to a first predetermined distance of sliding movement of said bolt in a direction toward said locking position for wedging the outer end of the bolt laterally inward toward said latch means to thereby bring said outer end of said bolt into engagement with said latch means.

8. The locking assembly of claim 7, and including second cam means operable in response to a second predetermined distance of sliding movement of said bolt in a direction towards said locking position for wedging the outer end of the bolt laterally inward to thereby gather the door member inwardly within said opening.

9. A locking assembly for locking a door member within an opening in a wall member, comprising a housing mounted on one of said members, latch means mounted on the other of said members, a bolt slidably disposed within the housing and having an outer end disposed to engage said latch means to lock the door member within said opening, said bolt being movable between an unlocked and a locked position, a cam element connected to the bolt, a cam surface connected to the housing, said cam surface being arranged with respect to said cam element so that engagement of the cam element with said cam surface on movement of said bolt in a direction toward said locking position will act to move the outer end of the bolt laterally inward towards the door member to bring said outer end into engagement with said latch means.

10. The locking assembly of claim 9, and including a second cam element connected to the bolt and spaced longitudinally of said first cam element, and a second cam surface connected to said housing, said second cam surface being arranged with respect to said second cam element so that engagement of said second cam element with said second cam surface on further movement of said bolt toward the locking position will act to gather the door member inwardly within said opening.

11. The locking assembly of claim 10, and including operating means located on the outer face of one of said members for moving said bolt within said housing, and means for pivotally connecting the inner end of said bolt to said operating means to thereby permit lateral movement of said bolt with respect to said housing.

12. The locking assembly of claim 9, wherein said latch means is provided with a first inclined surface and the outer end of the bolt is provided with a second inclined surface arranged to wedge against said first inclined surface and draw the bolt inwardly of said latch means.

References Cited

UNITED STATES PATENTS

| 2,529,606 | 11/1950 | Haseltine | 292—111 X |
| 3,386,205 | 6/1968 | Herr | 49—220 |
| 3,392,487 | 7/1968 | Madland et al. | 49—220 |

FOREIGN PATENTS

| 489,084 | 12/1952 | Canada. |
| 23,688 | 9/1910 | Great Britain. |

J. KARL BELL, Primary Examiner

U.S. Cl. X.R.

49—220, 300